No. 769,744. Patented September 13, 1904.

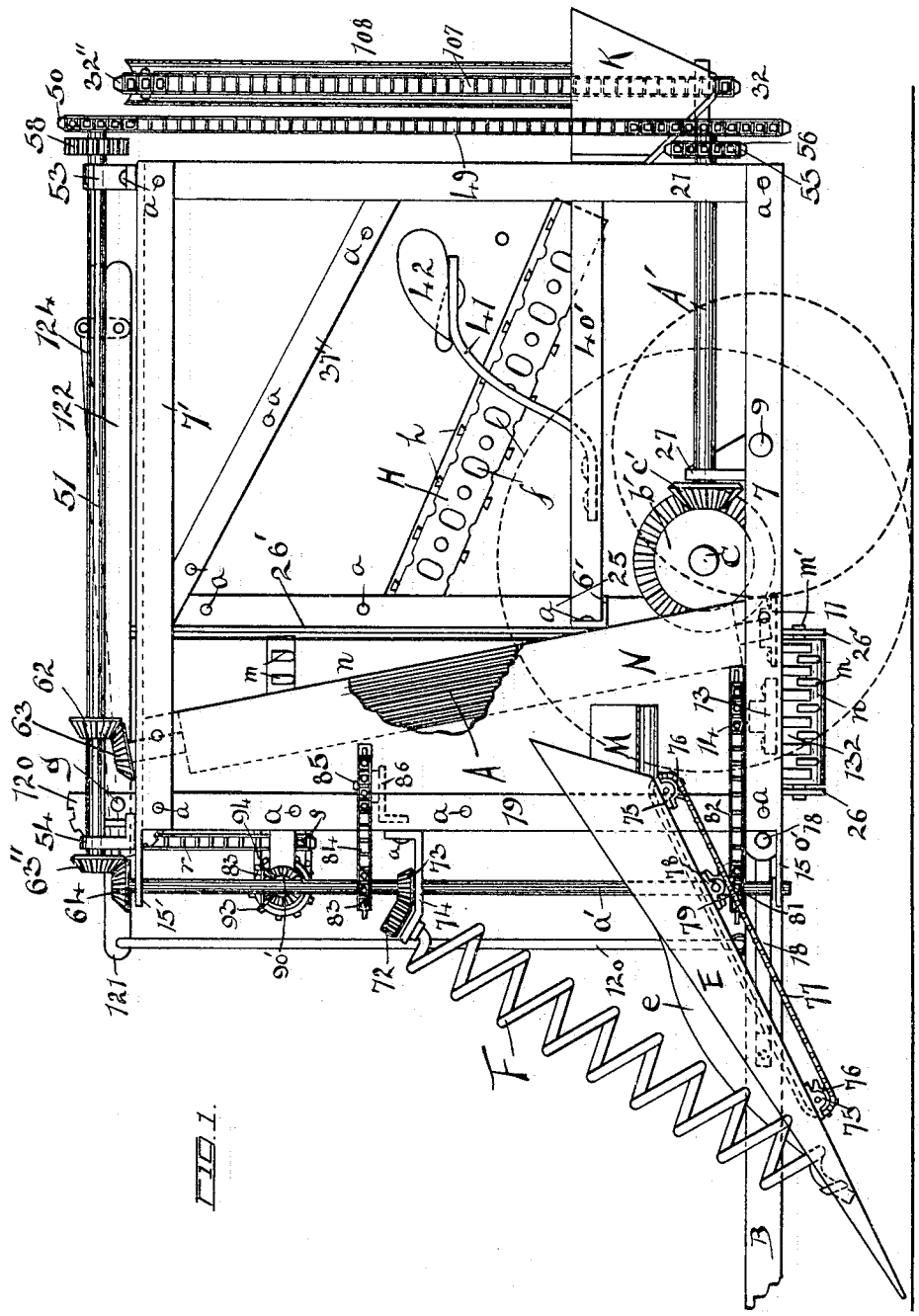

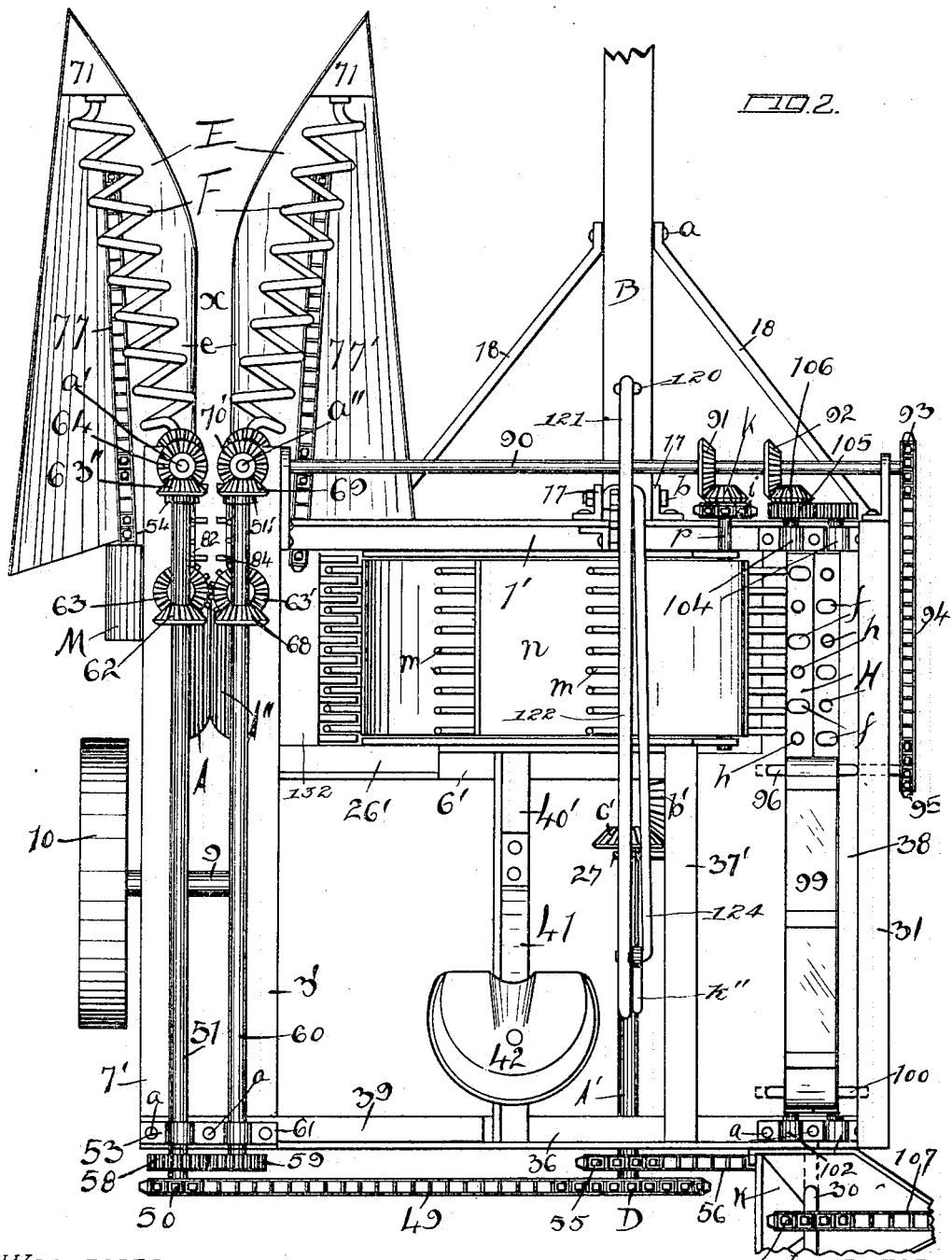

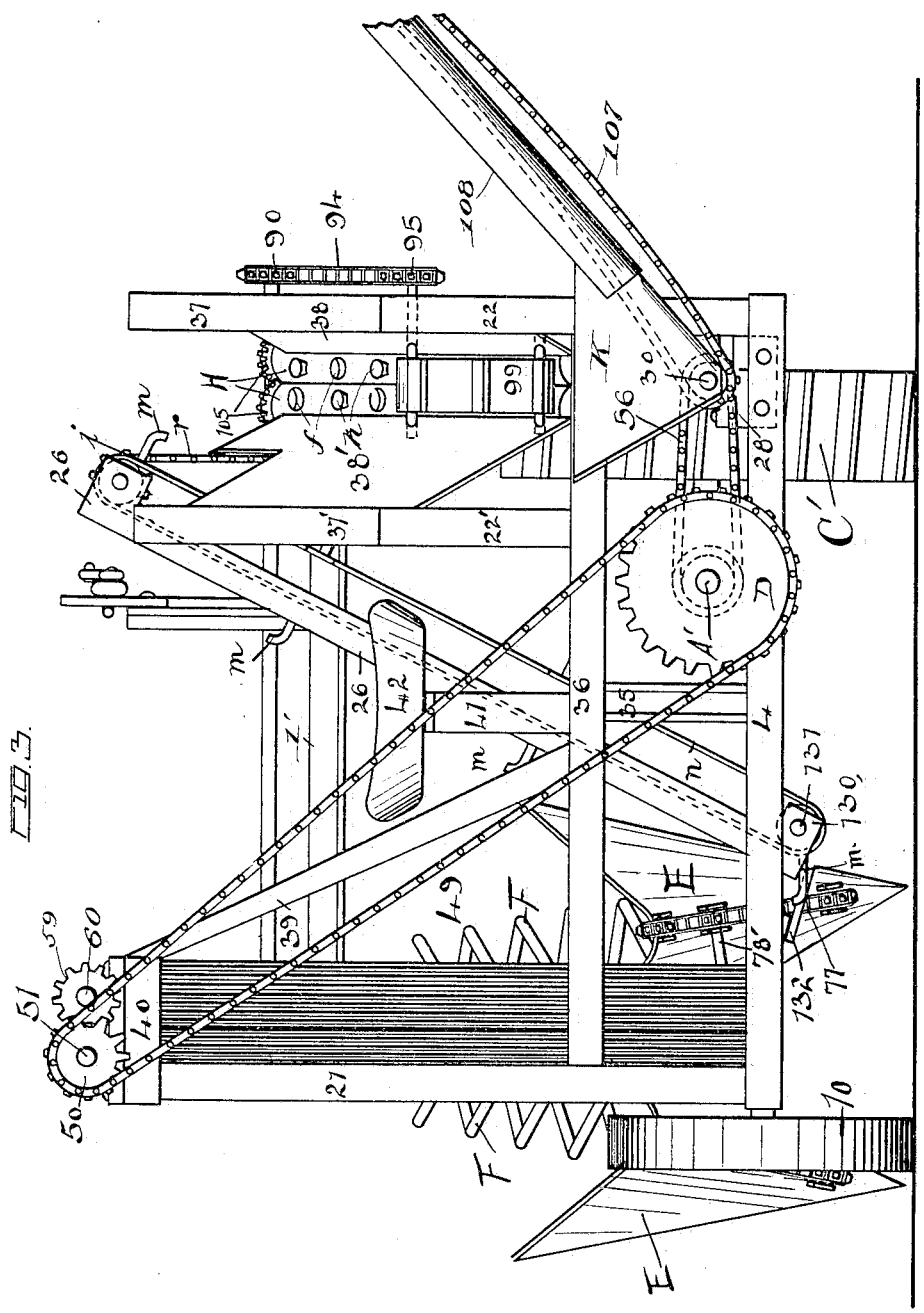

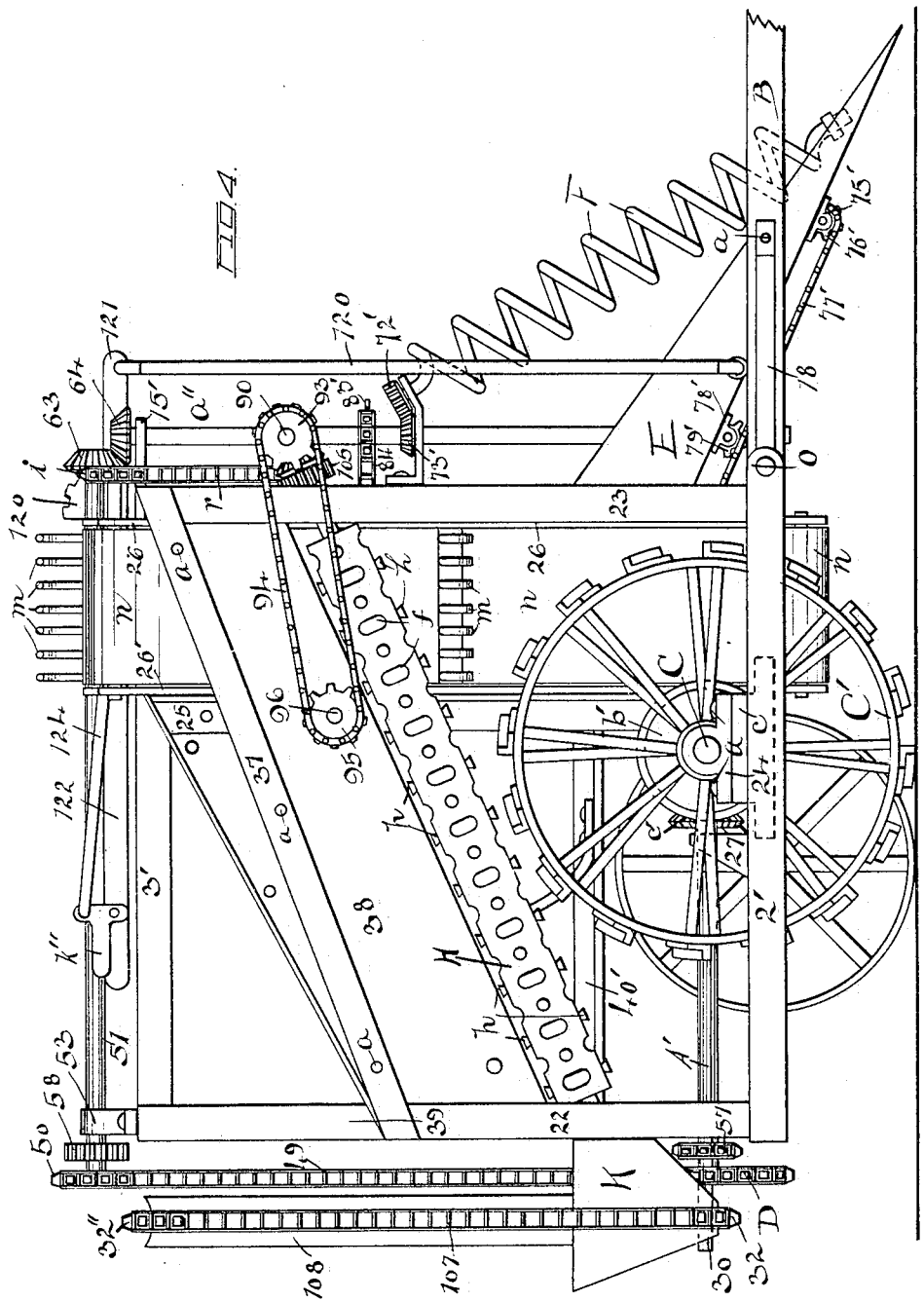

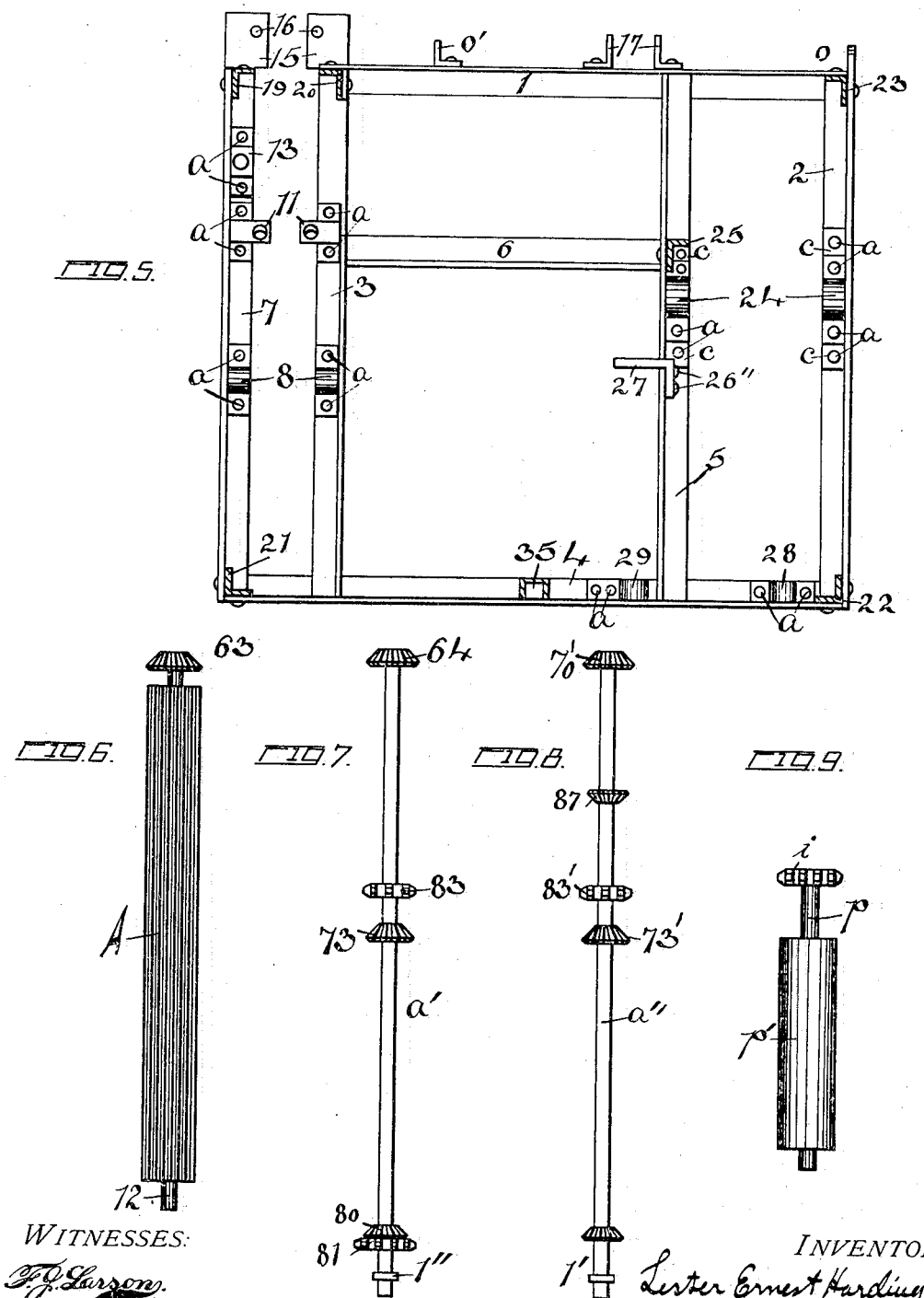

UNITED STATES PATENT OFFICE.

LESTER ERNEST HARDING, OF HORNICK, IOWA.

CORN HARVESTER AND HUSKER.

SPECIFICATION forming part of Letters Patent No. 769,744, dated September 13, 1904.

Application filed January 29, 1903. Serial No. 140,989. (No model.)

*To all whom it may concern:*

Be it known that I, LESTER ERNEST HARDING, residing at Hornick, in the county of Woodbury and State of Iowa, have invented certain useful Improvements in Corn Harvesters and Huskers; and I do hereby declare that the following is a full, clear, and exact description of the invention, such as will enable others skilled in the art to which it appertains to make and use the same, reference being had to the accompanying drawings, which form a part of this specification.

This invention has relation to a new and useful improvement in corn harvesting and husking machines.

The aim of my invention is to provide a machine adapted to be carried through the field to remove and snap the ears from the stalk, the ears being deposited upon suitable husking-rolls, where the husks are removed, the denuded ears finally being permitted to drop into a receptacle, from which they are elevated into a wagon traveling adjacent the harvesting and husking machine.

In the accompanying drawings I have shown in Figure 1 a side elevation, with portions removed, of a corn harvester and husker embodying my invention. Fig. 2 shows a top view of my improved corn harvesting and husking machine. Fig. 3 shows a rear end view, more particularly disclosing the arrangement of the power mechanism used to operate the husking-rolls and the elevating mechanism. Fig. 4 shows a side elevation, in which is disclosed one of the husking-rolls in connection with the driving-wheel and connected mechanisms. Fig. 5 shows a top view, partly in section, of one of the frame members as used in my invention. Fig. 6 shows a detail of one of the snapping-rollers. Fig. 7 shows an elevation of the driving-shaft actuating the left stalk-conveying spiral. Fig. 8 discloses a detail of the vertical shaft used in actuating the right stalk-conveying spiral, while Fig. 9 discloses a detail of one of the rolls supporting the conveyer provided with the rakes used to elevate the corn from the snapping-rollers to the husking-rolls.

As has been set forth, the aim of my invention is to provide a machine adapted to be carried through the field and arranged to remove the ears from the cornstalk, elevating them to a set of snapping-rolls, from whence the ears are elevated to a set of husking-rolls, finally being deposited in a suitable receptacle, as will be described more fully hereinafter.

In carrying out the aim of my invention I construct a supporting-frame, approximately rectangular, comprising a counterpart top and bottom frame member. These top and bottom frame members are made of angle-iron and comprise the forward member 1, to which are secured the side members 2 and 3, as is shown in Fig. 5, and further secured by the rear frame member 4. The frame members 1 and 4 are strengthened by the transverse member 5, and the members 3 and 5 again by means of the transverse frame member 6. Extending from the projecting end of the frame member 4, which member is slightly longer than the member 1, is a side member 7, forming, in conjunction with the member 3, a narrow channel. The members 3 and 7 are provided with bearings 8, adapted to hold the stub-shaft 9, (shown in Fig. 2,) provided with the supporting-wheel 10, as disclosed. These parallel frame members 3 and 7 are each provided with a bearing 11, these bearings being adapted to support the snapping-rolls A A'', each having the shaft projection 12 working within one of the bearings 11. The frame member 7 is in addition provided with the bearing 13, adapted to hold the stub-shaft of a suitable chain-sprocket 14, this sprocket and the bearing 13 being clearly indicated, the latter in dotted lines in Fig. 1. Still referring to Fig. 5 it will be noticed that these frame members 3 and 7 are each provided with a projecting bearing-plate 15, provided with the bearing-opening 16, one of these plates being shown in Fig. 1. These bearings 16 are adapted to hold the vertical driving-shafts $a'$ and $a''$, the first being held within the bearing-plate secured to the member 7 and the latter shaft within the bearing-plate secured to the frame member 3. To prevent these shafts from dropping through the plates, I provide the collars 1' and 1, as disclosed in Figs. 7 and 8.

Extending from the forward frame member 1, as shown in Fig. 5, are the ears 17, between which is pivotally held the tongue B, as is disclosed in Fig. 2, secured by means of an ordinary bolt $b$, by means of which the tongue is pivotally secured to the frame. This frame member 1 is further provided with the ears O O', adapted to hold the brace-bars 18 18, (shown in Fig. 2,) which extend from the tongue B, being secured thereto by the bolt $a$, these brace members 18 being secured to the ears by means of suitable bolts.

Extending upward from the forward end of the frame members 3 and 7 and adjacent the bearing-plates 15 are the standards 19 and 20, as shown in Fig. 5, which extend upward to hold the upper frame member 7' and 1' of the counterpart upper frame member, forming a portion of the frame used in supporting the working effects.

Extending upward from the rear end of the frame member 7 is the vertical member 21, while from the rear end of the frame member 2 is the vertical member 22, the forward end of this frame member 2 being provided with the vertical frame member 23, as disclosed in Fig. 5.

The frame members 2 and 5 are each provided with a bearing 24, which bearings are in alinement and are adapted to receive the driving-shaft C, provided with the bull-wheel C', by means of which the shaft C is driven.

Held adjacent the bearing 24, as shown in Fig. 5, and secured to the frame member 5 is a vertical frame member 25, which extends upward a suitable distance and is adapted to support the elevator-frame 26, as is shown in Fig. 4.

Extending from the vertical flange and the angle-iron frame member 5 is the bracket 27, held by means of the bolts 26'', as disclosed in Fig. 5. This bracket 27 is adapted to support at one end the horizontal longitudinally-supported shaft A', as shown in Fig. 4.

The bearings 24, as disclosed in Fig. 4, for the sake of convenience are held upon a block $c$, secured by suitable bolts.

The rear frame member 4 is provided near one end with the bearing 28, which is adapted to hold one end of the shaft 30, (shown in Fig. 3,) which shaft 30 is also shown in Fig. 2 and is adapted to support a suitable elevator-chain 31, passing over the chain-sprocket 32, secured to the shaft 30.

Secured to the frame member 4 adjacent the frame member 5 is the bracket 29, adapted, in conjunction with the bracket 27, (shown in Fig. 4,) to support the shaft A'.

Extending upward from the rear frame member 4 is a channel-bar 35, above which channel-bar 35 supports the intermediate transverse frame member 36, as disclosed in Fig. 3, the bearings secured to the frame, as is disclosed in Fig. 5, all being secured by means of suitable bolts $a$, the reference-letter $a$ throughout the drawings representing a bolt or its equivalent.

The vertical frame members 22 and 23, secured to the lower frame member 2, are united by the frame member 37, as is disclosed in Fig. 4, this frame member 37 being provided with a plurality of bolts $a$, adapted to secure the sheet-iron side 38, as shown.

Extending upward from the rear horizontal frame member 36 (shown is Fig. 3) is the upwardly-inclined frame member 39, (also shown in Fig. 4,) which above is secured to a simple bar 40, as is clearly disclosed in Fig. 3.

Extending upward from the horizontal frame member 36 (referred to in Fig. 3) is the vertical stub member 22', which above is provided with the inclined frame member 37', extending upward a suitable distance and being secured to a vertical frame member 25. (Shown in Fig. 5.)

Extending horizontally from the vertical frame member 25 (shown in Figs. 5 and 1) is the horizontal frame member 6', which is counterpart to the frame member 6, but does not extend outward as far, as shown in Fig. 2, and at its end this frame member 6' is secured to one side of the elevator-frame 26'.

Extending from the rear horizontally-disposed frame member 36 and resting upon the forward stub-frame member 6' (shown in Fig. 1) is an angle-iron bar 40', from which extends the seat-post 41, supporting the seat 42. This arrangement is also disclosed in Fig. 2.

Extending from the horizontal upper frame member 40, (shown in Fig. 3,) which member 40 is supported by the post 21 and the inclined frame member 39, are the two horizontally-disposed frame members 7' and 3', which extend forward and are secured to the vertical frame members 19 and 20, respectively. In Fig. 2 this arrangement is clearly indicated.

The driving power used in my invention is derived from the main shaft C, (shown in Fig. 1 and Fig. 4,) this shaft being held within the bearings 24, described as secured to the frame members 2 and 5. (Shown in Fig. 5.) This shaft C is provided with an ordinary bull-wheel C' and has secured to it upon the side opposite the bearing 24, secured to the frame member 5, the bevel-gear $b'$. (Indicated in Figs. 1, 4, and 2.) Meshing with this bevel-pinion $b'$ is the bevel-pinion $c'$, secured to the shaft A', held within the bearings 27 and 29. (Shown in Fig. 5.) At the rear end this shaft A' is provided with a chain-sprocket D, over which passes a chain 49, which above passes over a chain-sprocket 50, secured to the horizontal shaft 51. (Disclosed in top view of Fig. 2.) This shaft 51 is held within the bearing 53 at one end and within the bearing 54 at the remaining end, as disclosed in Fig 1. This shaft A' is further provided with the chain-sprocket 55, over which extends a chain 56, (shown in Figs. 2 and 3,) this chain passing over the chain-sprocket 57, (shown in Fig. 4,) this chain-sprocket 57 being secured to the shaft 30. (Disclosed in Fig. 4.) The shaft 51 is provided with the gear 58, meshing with the gear 59, secured to the shaft 60, held adjacent to and in parallel alinement with the shaft 51, this shaft 60 being held in front within the bearing 54', as is disclosed in Fig. 2. Within the rear end this shaft 60 is held within the bearing 61, as disclosed in Fig. 2. This shaft 51 is in addition provided with the bevel-pinion 62, which bevel-pinion 62 is adapted to mesh with the bevel-pinion 63 (shown in Fig. 6) and forming part of the snapping-rolls A. In front this shaft 51 is provided with the bevel-pinion 63'', which meshes with the bevel-pinion 64, (disclosed in Fig. 7,) and forming part of the shaft $a'$. The shaft 60 (shown in Fig. 2) is provided with the bevel-pinion 68, which meshes with the bevel-pinion 63', secured to a counterpart roller $A^2$, counterpart to the roller A, (shown in Fig. 6,) while in front the shaft 60 is provided with a bevel-pinion 69, meshing with the bevel-pinion 70, secured to the shaft $a^2$, (shown in Fig. 8,) the shafts 51 and 60, with their connected bevel gears and pinions, being clearly illustrated in Fig. 2, in which figure the snapping-rolls A and A'' are also shown as held in juxtaposition.

Extending from the forward part of the machine are the gathering-arms E, which gathering-arms incline from the frame downward, as is disclosed in Fig. 1, and are made of any suitable material, such as sheet-steel, to provide a smooth surface and which gathering-arms are held a suitable distance apart, so as to form a channel, as is shown in Fig. 2, which channel is in alinement with the channel formed between the frame members 7 and 3, the arrangement of these gathering-arms being clearly indicated in Fig. 2. Within the forward end each gathering-arm E is provided with the bearing 71, (shown in Fig. 2,) adapted to hold the lower ends of the two lifting stalk-conveying spirals F, which worm the stalks that may be in an inclined position into a vertical position, so that as the stalks are encountered they are presented to the machine in a vertical position. These stalk-conveying lifting-spirals are of any suitable size and material and above each spiral F is provided with a pinion, (marked 72 and 72', as shown in Figs. 1 and 4,) meshing with the pinions 73, and 73', respectively, these pinions 73 and 73', respectively, being secured to the counterpart vertical shafts $a'$ and $a''$, as is also disclosed in Figs. 7 and 8. These counterpart adjacently-positioned vertical shafts $a$ and $a''$ are held below within the ears 15, intermediately within the ears 74, and above within the ears 15', extending from the upper counterpart frame members 3' and 7', as is disclosed in Figs. 1 and 4. Above these vertical shafts are each provided with a bevel-pinion 64 and 70, as has been described and shown in Figs. 8 and 7 and described as being in gear connection with the shafts 51 and 60, as shown in Fig. 2. These gathering-arms are V-shaped, as is shown in Fig. 3, so as to form a trough, centrally from which extend these elevating and lifting spirals F, and should any ears of corn break off and drop from the stalks while being lifted by the spirals these ears would drop into the trough-shaped gathering-arms E. Below each gathering-arm E is provided with a bearing 75, positioned near each end, as is shown in Fig. 1, and these bearings hold the chain-sprockets 76, over which passes the chain 77, which chain is adapted to elevate and carry upward such ears of corn as might drop into the gathering-arms. Intermediately I provide each gathering-arm with the bearing 78, (disclosed in Fig. 1,) supporting a chain-sprocket 79, which is adapted to actuate the chain 77, this sprocket 79 receiving its motive power from the bevel-pinion 80, secured to the shaft $a'$ (shown in Fig. 7) and this shaft $a'$ being further provided with the chain-sprocket 81, over which passes the chain 82, in turn working over the chain-sprocket 14, described as working within the bearing 13 and shown in Fig. 1. Intermediately each shaft $a'$ and $a''$ is provided with a chain-sprocket 83 and 83', over which passes a chain 84, as is shown in Figs. 8 and 1, these chains 84 (shown in Fig. 1) passing over a chain-sprocket 85, secured within a suitable bracket 86, which bracket 86 being secured to the vertical post 20.

Secured to the shaft $a''$ is a chain-gear 83, as disclosed in Figs. 7 and 1. Passing over this gear 83 and over the chain-gear 85 is the chain 84, this chain when properly operating having a tendency to force the stalks inward, there being but one such chain 84. The shaft $a''$ is further provided with a bevel-pinion 87, (shown in Fig. 8,) which meshes with the gear 90' upon the horizontal shaft 90, as shown in Fig. 1. This shaft 90, as shown in Fig. 2, is provided with the bevel-gears 91 and 92 and the end chain-sprocket 93. The end sprocket 93 is in chain connection by means of the chain 94 with the sprocket 95, secured to the shaft 96, (shown in Fig. 2,) provided with a roller over which passes the traveling shield 99, adapted to keep the ears upon the husking-rollers H, one of which is shown in Fig. 4 and which husking-rollers are positioned immediately below this traveling shield 99. At its remaining end is provided a second roll-provided shaft 100, as is shown in Fig. 2, over which the shield 99 passes.

Secured to the horizontal frame member 36 are two bearings 102, (shown in Fig. 2,) which hold and support the lower ends of the husking-rollers H, which above have their projecting shaft ends working within suitable bearings 104, (shown in Fig. 2,) secured to the transverse frame member 1', positioned immediately above the frame member 1 and uniting the vertical members 20 and 23, this frame member 1' being disclosed in Fig. 2.

Each husking-roller H is provided in front with a pinion 105, (shown in Fig. 2,) which mesh with one another. The husking-roller H upon one side, however, is further provided with the bevel-pinion 106, meshing with the bevel-pinion 92 upon the shaft 90, so that these husking-rolls are revolved toward one another. Each husking-roll is provided with a plurality of seatings $f$ and a plurality of pins and a plurality of projecting pins $h$, the pins of one roller being adapted to work within the seatings $f$ of the adjacent roller, as is shown in Fig. 3. It will be noticed that these husking-rolls decline downward from the forward end of the machine, so that the ears which drop upon the same gradually gravitate downward toward the rear end of the machine and empty into a hopper K, within which hopper is held a gear-wheel 32, over which passes a suitable chain 107 to convey and carry upward the ears, this chain 107 working within the elevator 108, as shown.

The snapping-rollers A are disposed in sets of twos, each inclining slightly forward, as is disclosed in Fig. 1, and the snapping-rollers being provided with the bevel-pinion 63 and 63', meshing, respectively, with the bevel-pinion 62 and 68, as shown in Fig. 2, so that these snapping-rollers revolve toward one another. Below each snapping-roller is held within one of the bearings 11. (Shown in Fig. 5.)

The lower chain 82 is provided with large projecting teeth and hinged to provide a grated bottom between the frames, so that any corn that drops will be deposited upon these teeth and be carried by them to the lower portions of the snapping-rollers.

The elevating-chain 77, disposed with the trough-shaped gathering-arms E, are intended to elevate the ears into a trough M and are permitted to slide from this hopper upon the chain 82 to be also directed to the snapping-rollers A, so that this chain 82, with its projecting hinged teeth, forms an important part, in that it carries to the snapping-rolls such ears as are broken from the stalk in encountering the mechanisms outside of the snapping-rollers. So, also, such ears as fall from the snapping-rollers, which it will be noticed are inclined forward, fall upon this tooth-provided chain.

Secured to the tongue B is a rod 120, extending upward and above, being secured to the forward end 121 of the lever 122, supported, as shown in Fig. 1, upon the pin $g$, which passes through the tooth-sector 120 and into which snaps the lower end of a thumb-latch 124, as is shown in Fig. 4, so that the forward end of this corn-harvester may be raised and lowered. The rod 124 is secured to the latch $k''$.

Extending upward from adjacent the husking-rollers H, as shown in Fig. 3, are the two shields 38 and 38', so as to form a trough, within the bottom of which are the husking-rolls and the endless shield 99.

Secured to the lower end of the frame, as is shown in Fig. 3, are the bearings 130, holding the shaft 131, over which passes the endless conveyer $n$, provided with the projecting-teeth $m$, these teeth being adapted to collect the corn passing through a grated bottom 132, positioned in front of the snapping-rollers, so that everything that passes or is dropped in front of the snapping-rollers drops upon the grated bottom 132, where it is elevated and carried upward by the endless elevator $n$. The stalks alone pass through the snapping-rolls A and are then broken down in the machine passing over the same. The endless elevator $n$ is held above by means of a roll secured to the shaft $p$, provided with the chain-sprocket $i$, from which chain-sprocket $i$ (shown in Fig. 3) extends a chain $r$, (also shown in Fig. 4,) which chain below passes over a chain-sprocket $s$, (shown in Fig. 1,) secured to a stub-shaft $p'$, secured to the transverse frame member 1'.

Upon the outside the frame members 7, 19, and 7' are provided with the shield N. (Shown partly broken away in Fig. 1 to disclose one of the snapping-rolls A.)

The stub-shaft $p'$, positioned immediately below the shaft $p$, (shown in Fig. 2,) being described as provided with the chain-sprocket $i$, over which the chain $r$ passes, is provided with the bevel-pinion $k$, (shown in Fig. 2,) meshing with the pinion 91 upon the shaft 90, so that the endless apron end is properly actuated.

This machine is intended to be carried through the field by two draft-animals.

When all the instrumentalities have been properly arranged, the operation of my device would be as follows: The machine is carried through the field so that the spiral stalk elevators and conveyers insure the stalks being presented to the operating mechanisms in an upright position. The spirals F are rotated because of being in gear connection with the shafts $a'$ and $a''$, these shafts each being in gear connection with their complementary shafts 51 and 60, united by means of the gears 58 and 59, the shaft 51 being provided with a chain-sprocket 50, over which extends the chain 49, rotated by the shaft A' in gear connection with the driving-shaft C. The snapping-rollers are so positioned that they incline forward at the upper ends, so that if the stalks are properly presented to the machine the upper ends are first drawn between the snapping-rolls. Within the gathering-arms are the elevating-chains 77, which are operated by means of the chain-sprocket 78, (shown in Fig. 1,) which is in gear connection with the vertical shaft $a'$, driven as just described. The tooth-provided chain 82, forming the grated bottom in front of the inclined snapping-rolls, is rotated in passing over the chain-gear 81, fixed to the shaft $a'$. As the stalks are carried between the snapping-rolls A, which rotate toward one another, the stalks are forced through and between these snapping-rolls in such a manner that the ears drop downward upon the grated bottom 132, suitably secured to the supporting-frame and provided with openings through which the teeth $m$ of the elevator $n$ project, as is disclosed in Fig. 1. The lower drum supporting elevator $n$ is held by means of the shaft $m'$, supported within the lower ends of the elevator-frame members 26 and 26'. (Shown in Fig. 1.) The loose ears that drop from the stalks in advance of the rollers would drop upon the inclined platform M, emptying upon the grated bottom 132. From this grated bottom the ears gravitate toward the apron $n$, where the ears are collected and gathered by the gathering hooks, pins, or teeth $m$ and elevated, being deposited upon the husking-rolls H, which revolve toward one another and are adapted to nip and tear off the husks from the ear, the denuded ears finally gravitating into the hopper K, from which is raised the elevator 108, and deposited into a suitable wagon or other receptacle.

Having thus described my said invention, what I claim as new, and desire to secure by United States Letters Patent, is—

1. In a machine of the character described, the combination with a suitably-supported frame, of two trough-shaped gathering-arms extending from the forward portion of said frame, an elevating-spiral secured at the lower end within each of said gathering-arms, two vertical shafts, said elevating-spiral being in gear connection with said vertical shafts, two suitably-supported nipping-rolls, said nipping-rolls being held adjacent to one another, means to actuate said vertical shafts, mechanism to rotate said inclined nipping-rolls, a chain provided with projecting teeth forming a grate traveling adjacent to said inclined nipping-rolls, a shield adjacent said chain, an endless elevator adjacent said shield, a set of husking-rolls inclining downwardly and forwardly positioned adjacent said elevator, and mechanism to operate said husking-rolls and elevator.

2. The combination with a suitable supporting-frame provided with an opening below, forming a channel, a trough-shaped gathering-arm extending from said frame adjacent the channel upon each side, an elevating-spiral revolubly secured at one end to each of said arms, two brackets secured to said frame, supporting said elevator-spirals at the other end, driving mechanism to rotate said spirals toward one another, elevator-chains within the bottom of each trough-shaped gathering-arm, a chain provided with projecting pins, a shield, an elevator extending from said shield, a set of husking-rolls, one end of said husking-rolls being positioned adjacent the one end of aforesaid elevator, the opposite end of said husking-rolls extending downward and being suitably secured, and mechanism to operate said instrumentalities as and for the purpose set forth.

In testimony whereof I affix my signature in presence of two witnesses.

LESTER ERNEST HARDING.

Witnesses:
   JOHN C. CLARY,
   J. W. MEANS.